Patented Jan. 3, 1939

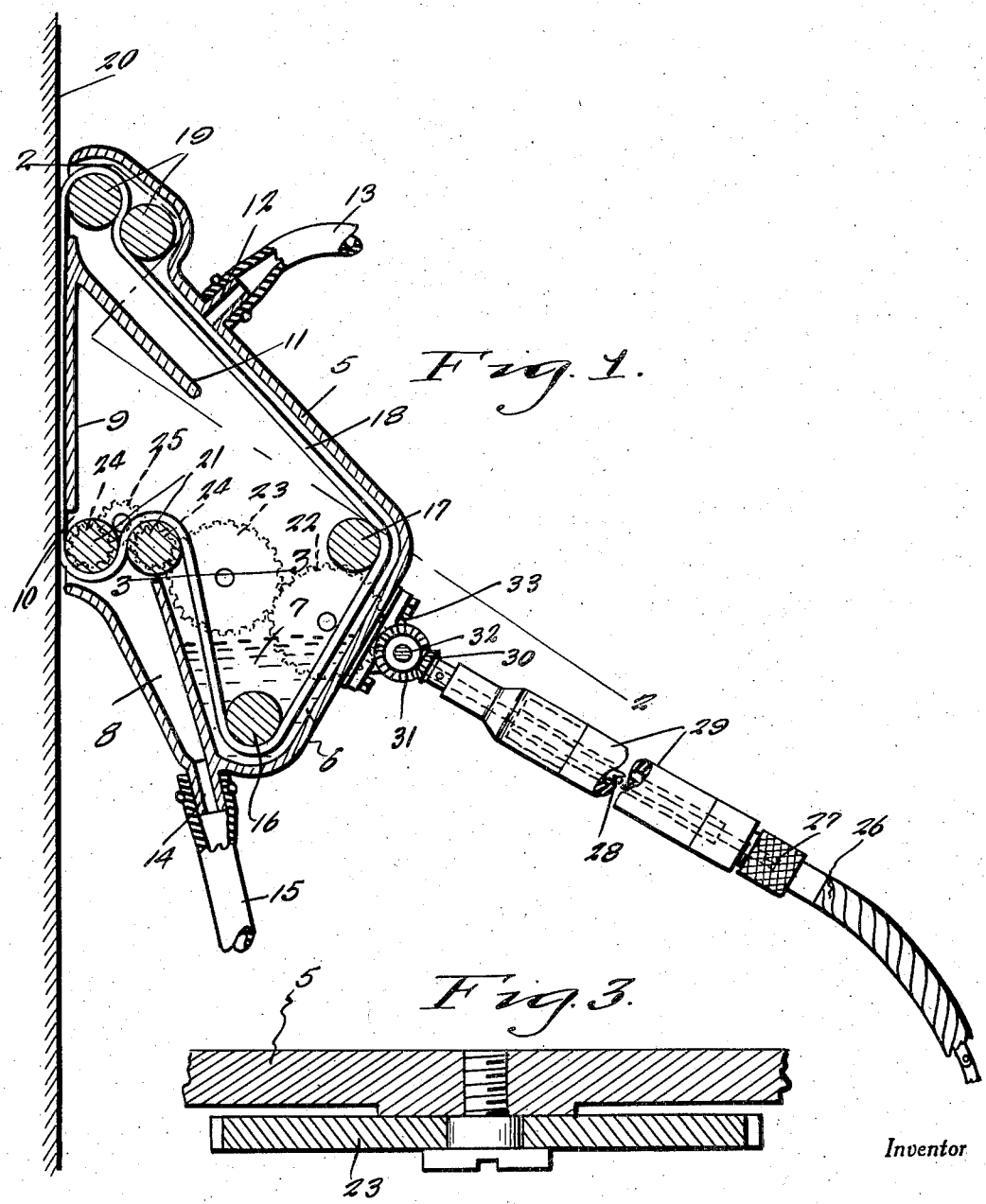

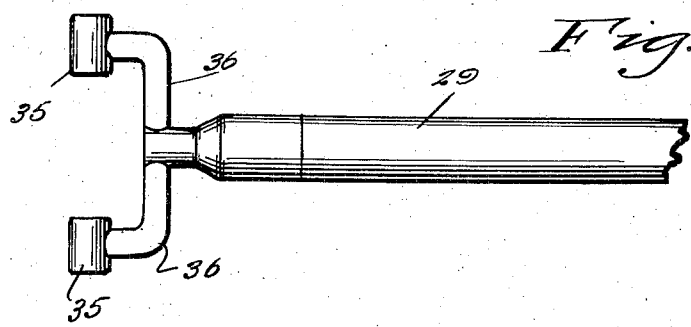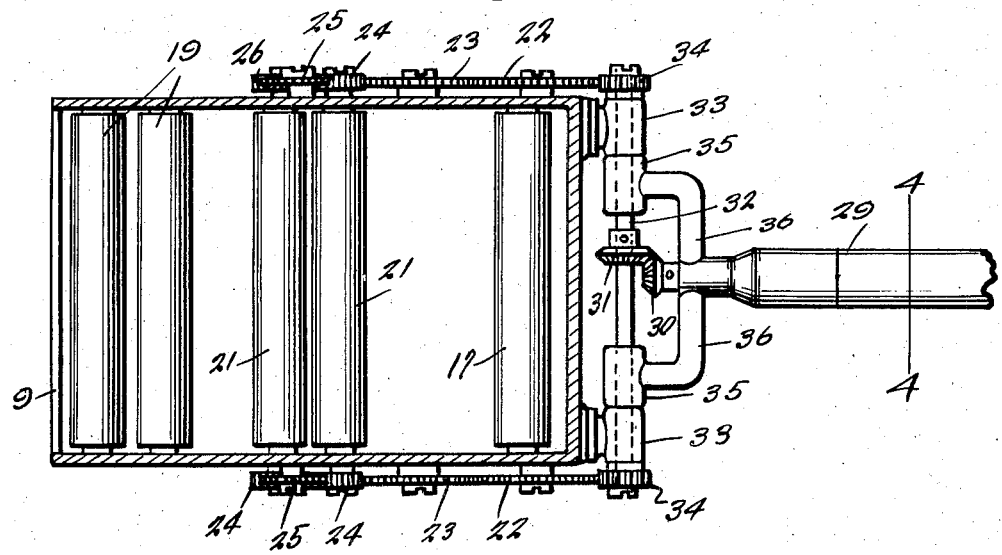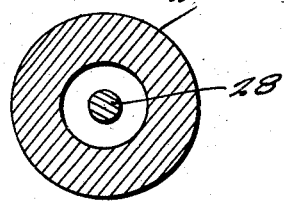

2,142,605

UNITED STATES PATENT OFFICE 2,142,605

SURFACE SCRUBBING MACHINE

Aaron G. Dawson and Ira Roy Wagner,
Oteen, N. C.

Application May 9, 1938, Serial No. 206,912

5 Claims. (Cl. 15—99)

This invention relates to machines for scrubbing surfaces, and an object of the invention is to provide a machine of this character that will be found particularly useful in scrubbing the surfaces of walls and ceilings.

In accordance with the present invention a machine of the character mentioned is provided which will be light in weight so as to be readily handled and thus rendering the same conducive for use in scrubbing the surfaces of walls and ceilings.

The invention together with its objects and advantages will be best understood from a study of the following description taken in connection with the accompanying drawings wherein:—

Figure 1 is a sectional view through the machine,

Figures 2 and 3 are detail views taken substantially on the lines 2—2 and 3—3 respectively of Figure 1, Figure 4 is a sectional view taken substantially on the line 4—4 of Figure 2, and Figure 5 is a plan view of a handle.

Referring to the drawings by reference numerals it will be seen that in accordance with the present invention there is provided a casing 5 of suitable shape and so constructed as to be light in weight. The casing 5 is formed to provide therein a trough 6 for the cleaning fluid, such as a soap solution 7, a trough 8 for receiving dirty water, a platen or belt-supporting member 9 at the open side 10 of the casing 5 and an inclined drip shield 11 that is formed integral with the platen or supporting member 9 and extends downwardly and inwardly from the upper edge of the member 9.

The casing 5 has one wall thereof provided with an integral inlet nipple 12 onto which may be sleeved one end of a hose 13 leading from a suitable source of clean water, while at the bottom of the trough 8 casing 5 is provided with an integral outlet nipple 14 for the trough 8 and onto which is sleeved one end of a hose or conduit 15 used for carrying off the used water from the trough 8.

Suitably arranged within the compartment 6 of the casing are rollers 16 and 17 over which is trained a belt 18. Belt 18 is also trained to pass between a pair of rollers 19—19 mounted within the casing 5 adjacent the open side 10 of the casing and above the plate 9, and the rollers 19 serve to squeeze the belt 18 therebetween in a manner to remove some of the cleaning solution from the belt as it passes over the outermost roller 19 and into contact with the wall or other surface 20 to be cleaned or scrubbed.

The belt 18 from the outermost roller 19 passes over the outer side of the supporting bar or platen 9 and then between a pair of wringer rollers 21 that are located just above the trough 8 and serve to wring the dirty water from the belt 18 as the belt passes over the mouth or inlet of the trough 8.

From the above it will be apparent that the belt 18 moves in a counter-clockwise direction and as it passes through the bath 7 the belt becomes impregnated with the cleaning fluid, some of which is squeezed from the belt as the latter passes between the rollers 19 so that the belt 18 will be in a suitably saturated condition as it passes over the plate 9 and in contact with the surface 20. As the belt moves from the surface 9 between the rollers 21 the dirty fluid is squeezed from the belt and the dirty fluid is received in the trough 8 draining from the trough through the outlet 14 and hose 15.

For driving the belt 19 in the proper direction as well as the wringer rollers 21 there is provided at each side of the casing 5 a train of gearing as shown in Figure 2, each train of gearing including a transmission gear 22 that is in mesh with an idler gear 23 which in turn is in mesh with a pinion 24 on the adjacent end of a roller 21. In this connection it will be noted that each of the rollers 21 is provided with a pinion gear 24 at each end thereof and the pinion gears 21 are in mesh with idler gears 25.

The gearing is driven from any suitable source of power such as an electric motor or the like through the medium of a flexible shaft 26 that is connected as at 27 with a shaft 28 that extends longitudinally of a handle 29. At the free end thereof the shaft 28 is provided with a gear 30 that is in mesh with a gear 31 provided on a shaft 32. Shaft 32 has the ends thereof journaled in suitable bearings 33 provided on a wall of the casing 5 as shown. On the respective opposite ends of the shaft 32 are gears 34 that are in mesh with the gears 22. Thus it will be seen that drive is transmitted from such source of supply through the shaft 26, shaft 28, to shaft 30, and from shaft 30 through the aforementioned gearing to the rollers 21 causing the latter to revolve for feeding the belt 18 around the rollers of the entire assembly. Obviously, the continuous movement of the belt will cleanse the surface as the belt is carried around the rollers, and through the medium of the wringing rollers 21 the dirty liquid is squeezed from the belt and discharged into the trough 8 from which it drains through the opening 14. During the continuous movement of the belt the machine is of course moved over the surface being scrubbed or cleaned.

The aforementioned handle 29 is pivoted to the machine through the medium of the aforementioned shaft 32 that extends through eyes 35 provided on the terminals of L-shaped arms 36 that extend laterally from one end of the handle 29 as shown. It will thus be seen that the device can be readily handled and thereby easily moved over a wall or ceiling surface for cleansing or scrubbing the surface.

It is thought that a clear understanding of the construction utility and advantages of a machine of this character will be had without a more detailed description.

Having thus described the invention what is claimed as new is:—

1. In a surface scrubbing machine of the character described, a casing having an open side and also having formed interiorly thereof a chamber for a liquid cleaning agent, and a trough between the open side of the casing and said chamber for receiving dirty liquid, an endless belt supported to move in the casing and to traverse the open space at the side of the casing as well as to pass over said trough and through said chamber, and a pair of coacting wringer rolls mounted in the casing above said trough and between which said belt is trained to be squeezed thereby for forcing the dirty liquid from the belt to discharge into said trough prior to the passage of the belt through said chamber.

2. In a surface scrubbing machine of the character described, a casing having an open side and also having formed interiorly thereof a chamber for a liquid cleaning agent, and a trough between the open side of the casing and said chamber for receiving dirty liquid, an endless belt supported to move in the casing and to traverse the open space at the side of the casing as well as to pass over said trough and through said chamber, and a pair of coacting wringer rolls mounted in the casing above said trough and between which said belt is trained to be squeezed thereby for forcing the dirty liquid from the belt to discharge into said trough prior to the passage of the belt through said chamber, a plate extending between opposed sides of the casing at the open side of the casing and over which the belt passes as it traverses the open side of the casing, a shield plate extending downwardly and inwardly from the upper end of the plate and a pair of rollers in the upper portion of the casing, adjacent the open side thereof and between which said belt passes to be squeezed thereby for pressing some of the cleaning liquid from the belt preparatory to the movement of the belt over the first-mentioned plate, the liquid pressed from the belt falling upon the shield plate and said shield plate preventing the liquid from falling on the wringer rolls.

3. In a surface scrubbing machine of the character described, a casing having an open side and also having formed interiorly thereof a chamber for a liquid cleaning agent, and a trough between the open side of the casing and said chamber for receiving dirty liquid, an endless belt supported to move in the casing and to traverse the open space at the side of the casing as well as to pass over said trough and through said chamber, and a pair of coacting wringer rolls mounted in the casing above said trough and between which said belt is trained to be squeezed thereby for forcing the dirty liquid from the belt to discharge into said trough prior to the passage of the belt through said chamber, a plate extending between opposed sides of the casing at the open side of the casing and over which the belt passes as it traverses the open side of the casing and a pair of rollers disposed in the casing adjacent the open side of the casing and the upper edge of said plate and between which said belt passes to be squeezed thereby for pressing some of the cleaning liquid from the belt preparatory to the movement of the belt over said plate.

4. In a surface scrubbing machine of the character described, a casing having an open side and also having formed interiorly thereof a chamber for a liquid cleaning agent, and a trough between the open side of the casing and said chamber for receiving dirty liquid, an endless belt supported to move in the casing and to traverse the open space at the side of the casing as well as to pass over said trough and through said chamber, and a pair of coacting wringer rolls mounted in the casing above said trough and between which said belt is trained to be squeezed thereby for forcing the dirty liquid from the belt to discharge into said trough prior to the passage of the belt through said chamber, a plate extending between opposed sides of the casing at the open side of the casing and over which the belt passes as it traverses the open side of the casing and a pair of rollers disposed in the casing adjacent the open side of the casing and the upper edge of said plate and between which said belt passes to be squeezed thereby for pressing some of the cleaning liquid from the belt preparatory to the movement of the belt over said plate, a handle connected with said casing at one end of the latter and means pivotally connecting the handle to the casing including a shaft journaled on said casing and gearing disposed at opposite sides of the casing and connecting said shaft with the wringer rollers for transmitting drive from said shaft to the wringer rollers.

5. In a surface scrubbing machine of the character described, a casing having an open side and also having formed interiorly thereof a chamber for a liquid cleaning agent, and a trough between the open side of the casing and said chamber for receiving dirty liquid, an endless belt supported to move in the casing and to traverse the open space at the side of the casing as well as to pass over said trough and through said chamber, and a pair of coacting wringer rolls mounted in the casing above said trough and between which said belt is trained to be squeezed thereby for forcing the dirty liquid from the belt to discharge into said trough prior to the passage of the belt through said chamber, a plate extending between opposed sides of the casing at the open side of the casing and over which the belt passes as it traverses the open side of the casing and a pair of rollers disposed in the casing adjacent the open side of the casing and the upper edge of said plate and between which said belt passes to be squeezed thereby for pressing some of the cleaning liquid from the belt preparatory to the movement of the belt over said plate, a handle connected with said casing at one end of the latter and means pivotally connecting the handle to the casing including a shaft journaled on said casing and gearing disposed at opposite sides of the casing and connecting said shaft with the wringer rollers for transmitting drive from said shaft to the wringer rollers, a shaft journaled in said handle, gearing connecting the last-mentioned shaft with the first-mentioned shaft, and a flexible shaft connected at one end with the shaft in said handle and serving as a means for connecting the shaft in the handle with a source of power.

AARON G. DAWSON.
IRA R. WAGNER.